United States Patent
Suda et al.

(10) Patent No.: US 7,328,075 B2
(45) Date of Patent: Feb. 5, 2008

(54) METHOD OF AUTOMATIC ADJUSTMENT OF THE CONTROL PARAMETERS OF A MAGNETIC SUSPENSION SYSTEM

(75) Inventors: Shinichi Suda, Tokyo (JP); Hideo Sawada, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 86 days.

(21) Appl. No.: 11/042,164

(22) Filed: Jan. 26, 2005

(65) Prior Publication Data

US 2006/0111863 A1 May 25, 2006

(30) Foreign Application Priority Data

Nov. 22, 2004 (JP) ............................. 2004-337757

(51) Int. Cl.
*G05B 13/02* (2006.01)
(52) U.S. Cl. .................... 700/28; 700/32; 700/37; 700/41
(58) Field of Classification Search ............... 700/28, 700/32, 37, 41
See application file for complete search history.

(56) References Cited

U.S. PATENT DOCUMENTS 4,523,166 A   6/1985   Gross
6,163,730 A * 12/2000   Hayner .................. 700/54

FOREIGN PATENT DOCUMENTS

EP   0 481 204 A3   4/1992
JP   2004-4025      1/2004

OTHER PUBLICATIONS

P.K. Sinha et al, "Electromagnetic Suspension: New Results Using Neural Networks", Nov. 1993, pp. 2971-2973.*
M. Morishita, "Robust Controller Design for Maglev Transport Vehicles with a Guide-Effective Electromagnetic Suspension System", Dec. 1996, pp. 1242-1244.*
J. Yang et al., "Application of Composite Fuzzy-PID Algorithm to Suspension System of Maglev Train", Nov. 2004, pp. 2502-2505.*

(Continued)

*Primary Examiner*—Ronand Hartman, Jr.
(74) *Attorney, Agent, or Firm*—Westerman, Hattori, Daniels & Adrian, LLP.

(57) ABSTRACT

In adjustment of the control parameters of a magnetic suspension system, an object of the present invention is to provide a technique for adjusting the control parameters to optimum values automatically by employing the iterative feedback tuning method, without increasing the complexity of the program, the amount of calculation and the overall size of the system, and still reducing the amount of calculation required for calculation of the safety margin (gain margin and phase margin). In a method of automatic adjustment of control parameters according to the invention, when applying the iterative feedback tuning method to a feedback control system for a magnetic suspension system, only those control parameters that have a significant effect on the control performance of the system are selectively adopted/discarded from among control parameters so that the control parameters are guided to optimum values to obtain a response waveform desired by a designer directly from input/output data of a control subject.

6 Claims, 4 Drawing Sheets

OTHER PUBLICATIONS

H. Rodriguez et al., "Experimental Comparison of Linear and Nonlinear Controllers for a Magnetic Suspension", Sep. 2000, pp. 715-719.*

Karimi et al., "Iterative correlation-based controller tuning with application to a magnetic suspension system", Control Engineering Practice, vol. 11 (2003), pp. 1069-1078.

"PID" by Nobuhide Suda, Association for System Control Information of Japan, Asakura shoten, 1993. (English translation) ( p. 108; Table 5.1 w/ English only translation of Table 5.1).

Franky De Bruyne et al., Proceedings of the American Control Conference, California, Jun. 1999, pp. 3317-3321.

Håkan Hjalmarsson et al., Proceedings of the 33$^{rd}$ Conference on Decision and Control, Dec. 1994, pp. 1735-1740.

* cited by examiner

Fig. 1
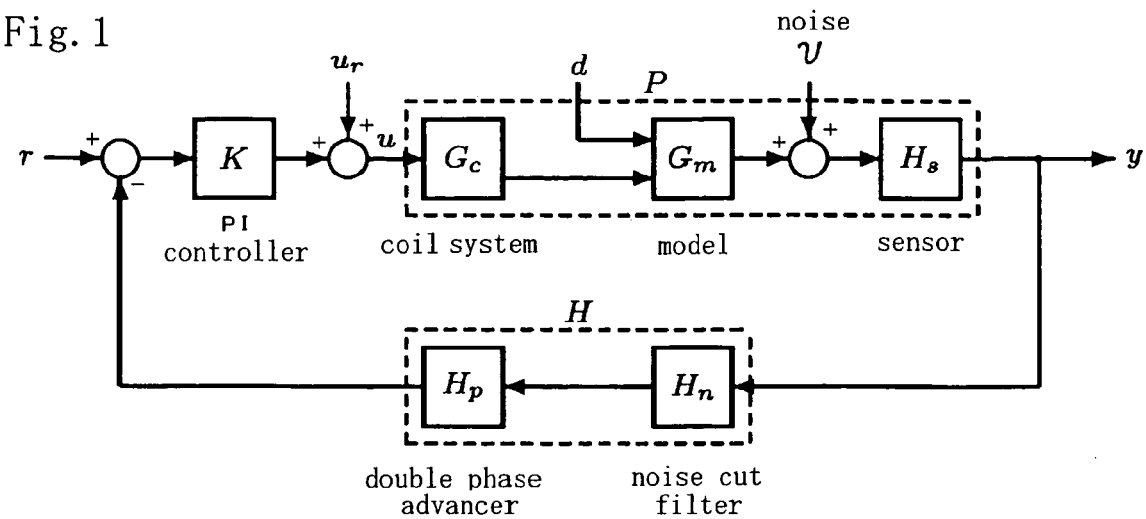
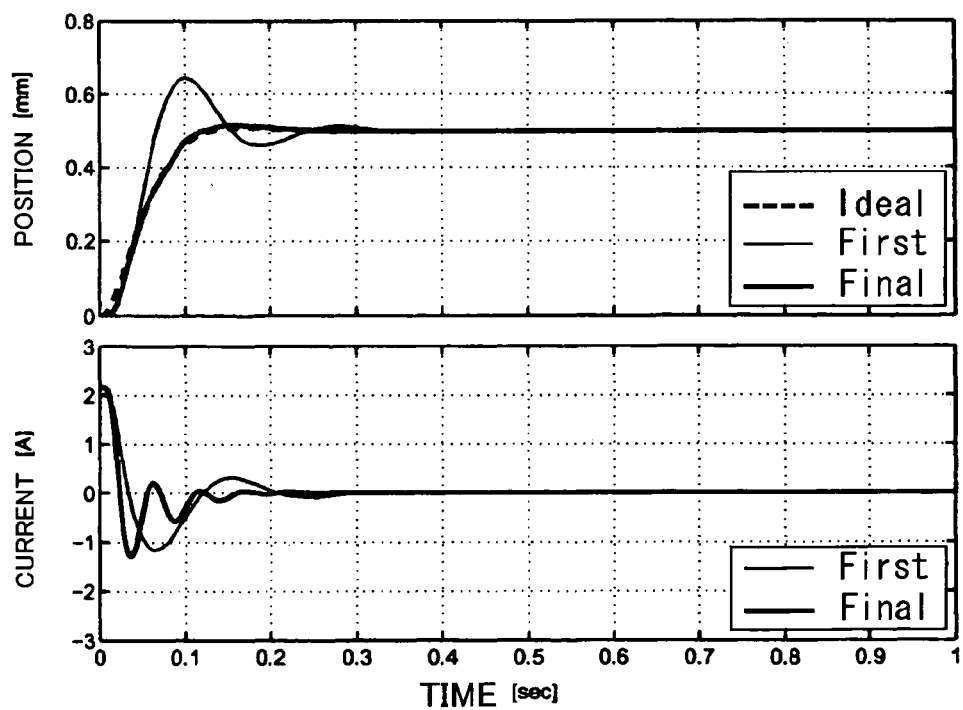
Fig. 2 Step responses

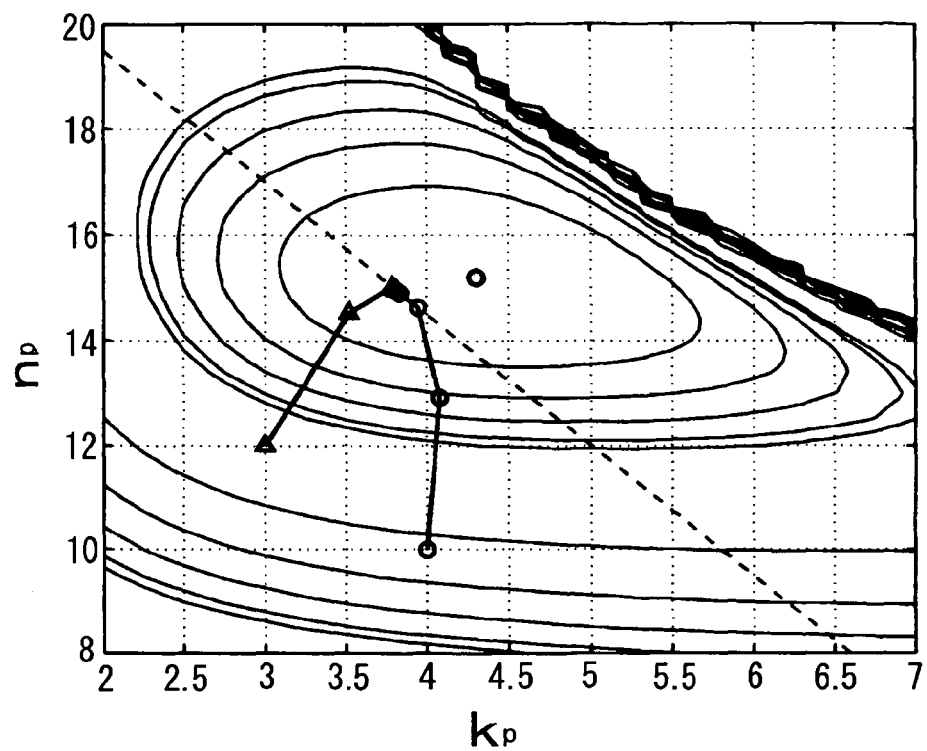
Fig.3 Contour graph of the performance index
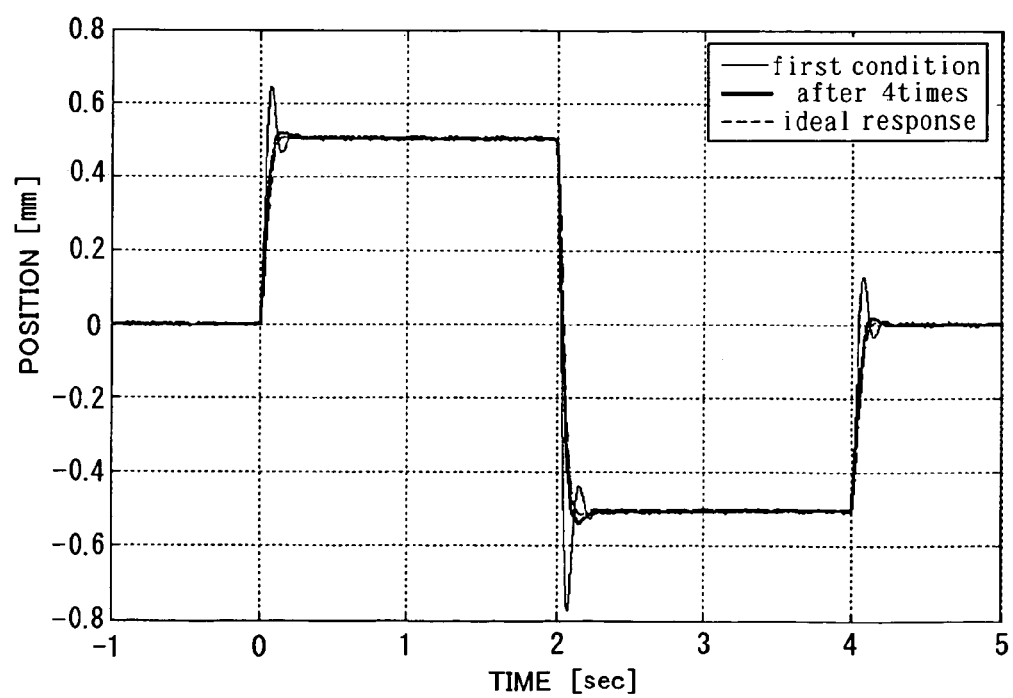
Fig.4 Comparison with an ideal responses

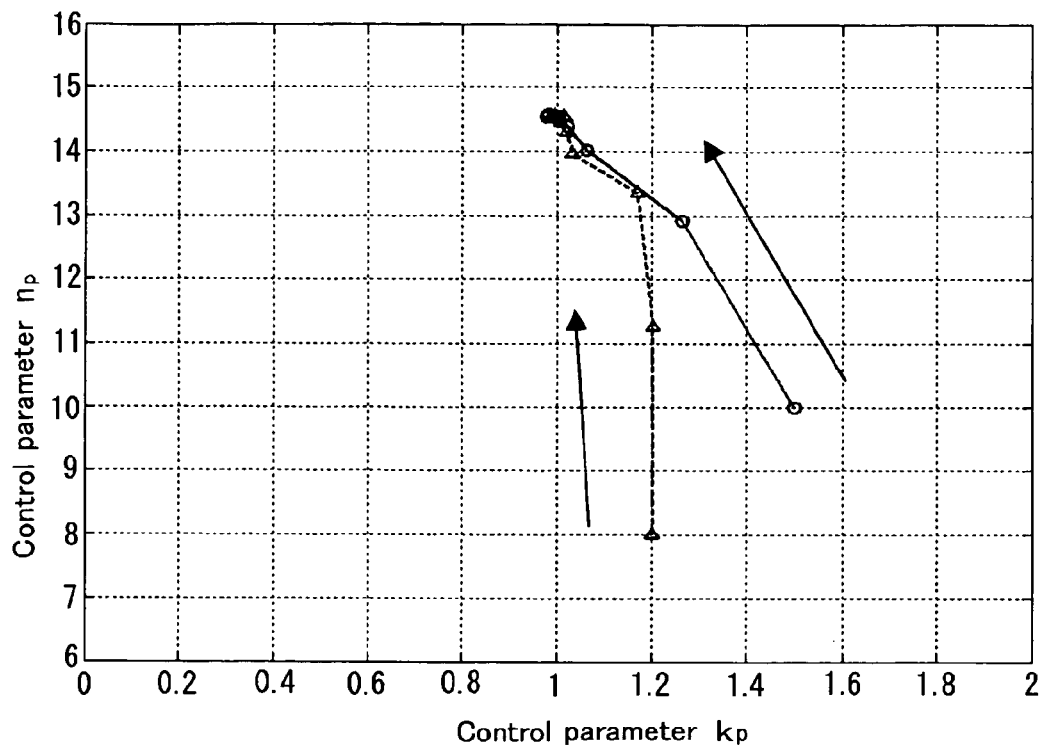
Fig.5 A transition of control parameters
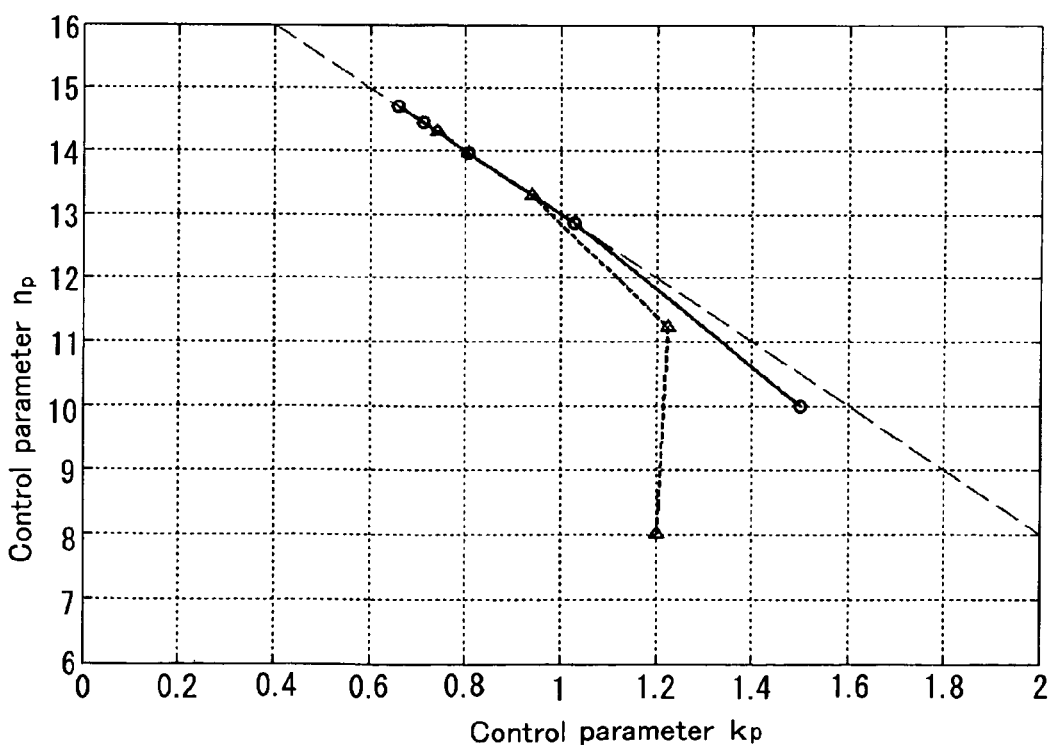
Fig.6 A Transition of Control parameters under the constraint condition (prior)

METHOD OF AUTOMATIC ADJUSTMENT OF THE CONTROL PARAMETERS OF A MAGNETIC SUSPENSION SYSTEM

BACKGROUND OF THE INVENTION

1. Field of the Invention

The present invention relates to a technique for adjusting the control parameters of the feedback control system provided in a magnetic suspension and balance system automatically to an optimum value within a given stable searching range.

2. Description of the Related Art

A wind tunnel magnetic suspension and balance system is a device for supporting a wind tunnel model in a desired position by magnetic force, without requiring supporting structure such as support struts or stings. Such magnetic suspension and balance systems have attracted attention since they can provide an ideal environment for finding the drag coefficient of an object or measuring the conditions of wake, since there is no interference between the airflow and the supporting structure. Furthermore, they are expected to present opportunities for new developments in that they make it possible to apply desired movement to a model in a wind tunnel. Such magnetic suspension and balance systems are provided with a control system for supporting a model in a desired position by responding to any changes that may occur in conditions in the wind tunnel. The control parameters of the feedback control system that drives this magnetic suspension system are important factors in determining the stability of the supported model. These control parameters can be provisionally calculated by the equations of motion of the magnetic suspension and balance system and empirical rules, but, since the equations of motion contain uncertainties such as errors of parameters, the calculated values are rough estimations, and must be adjusted. At the present time there is no alternative to a method in which the adjustment of the control parameters is performed manually whilst observing the response of the model on site; however, such adjustment requires a considerable amount of time and, in addition, there is no guarantee that an optimum value will be obtained.

On the other hand, regarding automatic adjustment of the control parameters, a method called iterative feedback tuning has been developed in recent years and studies have been carried out aimed at applying this to various systems. However, there are no examples of application of this technique to a magnetic suspension and balance system and only a handful of studies have therefore been made regarding maintenance of stability. Also, in the case of a magnetic suspension and balance system, the problem was experienced that optimum control parameters could not in fact be obtained when the iterative feedback tuning method was applied without modification to the case of four control parameters.

In Non-patent Reference 1 ("PID control" by Nobuhide Suda, compiled by the Association for System Control Information of Japan, Asakura Shoten, 1993), a comparative table (Table 5.1 on p. 108) is presented of systems of automatic adjustment of PID control as adopted by Toshiba, Hitachi, Fuji Denki, Mitsubishi Heavy Industries, Yokogawa and Yamatake Honeywell. Identification of subjects of control (i.e. finding a mathematical model capable of representing the input/output relationships) has been performed by Mitsubishi Heavy Industries and others, but increased complexity of the program and an increased amount of calculation may be anticipated. Also, Mitsubishi Heavy Industries adopt the technique of setting a single performance index in respect of a single control parameter, so, if a plurality of controllers are required, further performance indexes must be set up, to the number of the controllers. This therefore results in the problem of a system of large overall size.

An example of a method for guaranteeing stability of an iterative feedback tuning system is reported in Non-patent Reference 2 (Iterative Feedback Tuning with Guaranteed Stability, Franky De Bruyne and Leonardo C. Kammer, Proceedings of the American Control Conference, pp. 3317-3321, 1999). This is a method of evaluating the margin of stability of a system (i.e. the gain margin and phase margin) simultaneously with performance of ordinary iterative feedback tuning. However, there may be a problem regarding increase of the amount of calculation required to calculate the stability margin in this case.

SUMMARY OF THE INVENTION

In conventional magnetic suspension and balance systems, fine adjustment is performed whilst observing the actual response during actual levitation tests after applying approximate control parameters based on previously linearized equations of motion and empirical rules. However, such adjustment required a considerable amount of time and optimality of the adjusted values could not be guaranteed.

In adjustment of the control parameters of a magnetic suspension system, an object of the present invention is to provide a technique for adjusting the control parameters to optimum values automatically by employing the iterative feedback tuning method, wherein increased complexity of the program and increase in the amount of calculation and increase in the overall size of the system are avoided, and in which the amount of calculation required for calculation of the safety margin is reduced.

In the method of automatic adjustment of control parameters according to the present invention, when applying the iterative feedback tuning method to a feedback control system for a magnetic suspension system, only those control parameters that have a significant effect on the control performance of the system are selectively adopted/discarded from among control parameters so that the control parameters are guided to optimum values to obtain a response waveform desired by a designer directly from input/output data of a control subject.

In the method of automatic adjustment of control parameters according to the present invention, it may be further arranged to apply constraint conditions to the control parameters in order to guarantee the stability of a magnetic suspension system.

Also, in the method of automatic adjustment of control parameters according to the present invention, it may be further arranged to adopt the proportional gain ($k_p$) of proportional integral control and the time constant ratio ($n_p$) of the numerator and denominator of the phase advancer as the control parameters that have a significant effect on stability of the system, of control parameters of which there are four for a single axis, in respect of a feedback control system in which proportional integral control and double phase advancer are jointly employed in a magnetic suspension and balance system.

Yet further, when obtaining sampling data $y_t(t=1, 2, \ldots, N)$ of position of the model with respect to time sequence data $r_t(t=1, 2, \ldots, N)$ of a given target set position and sampling data $u_t(t=1, 2, \ldots, N)$ of control currents that are then applied, a performance index whereby the goodness of tracking of the target set position is evaluated may be set up by the following equation and a control parameter ρ may be found such as to optimize this evaluation function.

$$J(\rho) = \frac{1}{2N} \sum_{t=1}^{N} \{(T_d r_t - y_t)^2 + \lambda(\Delta u_t)^2\}$$

where λ>0 is a weighting coefficient, $\Delta=1-q^{-1}$ is a difference operator ($\Delta u_t = u_t - u_{t-1}$), and $T_d$ is a filter for generating the desired response waveform.

Also, in the method of automatic adjustment of control parameters according to the present invention, as constraint conditions on the control parameters for guaranteeing stability of control of the system, it may be further arranged to set upper and lower limits on the proportional gain ($k_p$) of proportional integral control and the time constant ratio ($n_p$) of the numerator and denominator of the phase advancer and to set an inequality constraint condition on the upper limit of the product of these two.

The method of automatic adjustment of control parameters according to the present invention, when applied to the iterative feedback tuning method in a feedback control system of a magnetic suspension system, makes it possible to suppress the calculation load to the necessary minimum since the designer may guide the control parameters to the optimum values such as to obtain the intended response waveform directly from the input/output data of the control subject, by selectively adopting/discarding only those control parameters that have a significant effect on the controllability of the system.

Also, with the method of automatic adjustment of control parameters according to the present invention, it may be arranged to add constraint conditions to the control parameters in respect of the feedback control system of a magnetic suspension system; this makes it possible to control the system in a stable fashion.

Also, with the method of automatic adjustment of control parameters according to the present invention, since it is arranged to adopt the proportional gain ($k_p$) of proportional integral control and the time constant ratio ($n_p$) of the numerator and denominator of the phase advance a factor as the control parameters that have a significant effect on stability of the system, of control parameters of which there are four, in respect of a feedback control system in which proportional integral control and double phase advancer are jointly employed in a magnetic suspension and balance system, the calculation node can be reduced and the control time can be shortened.

Furthermore, when obtaining sampling data $y_t$(t=1, 2, . . . , N) of position of the model with respect to time sequence data $r_t$(t=1, 2, . . . , N) of a given target set position and sampling data $u_t$(t=1, 2, . . . , N) of the control currents that are then applied, by setting up a performance index whereby the goodness of tracking of the target set position is evaluated by the above equation and finding a control parameter ρ such as to optimize this evaluation function, control parameters can be found for which the above performance index is a minimum by repeating the calculation several times.

Also, in the method of automatic adjustment of control parameters according to the present invention, as constraint conditions on the control parameters for guaranteeing stability of control of the system, by further arranging to set upper and lower limits on the proportional gain ($k_p$) of proportional integral control and the time constant ratio ($n_p$) of the numerator and denominator of the phase advance factor and to set an inequality constraint condition on the upper limit of the product of these two, the amount of calculation can be suppressed and stable control of the suspended object achieved, making it possible to perform control in real time.

To summarize, according to the present invention, the following beneficial effects can be achieved:
1) the time required for adjustment of the control parameters can be greatly shortened due to the automation;
2) improved efficiency regarding the amount of calculation and test period can be achieved since fully satisfactory adjustment results can be obtained even when the number of control parameters to be adjusted is restricted to two per axis;
3) optimization of the control parameters to be adjusted can be guaranteed;
4) comparison of test results between different models is facilitated, since control parameters are found with which the same control effect is obtained, even for different models;
5) specialist knowledge of control theory is unnecessary; and
6) stability can be secured with only a small amount of calculation.

BRIEF DESCRIPTION OF THE DRAWINGS

FIG. 1 is a block diagram of a feedback control system for a magnetic suspension and balance system;

FIG. 2 is a graph showing the step response of the initial parameters and the final parameters;

FIG. 3 is a view showing contours of the magnitude of the performance index and also showing how the control parameters are updated;

FIG. 4 is a graph showing the ideal response, the initial parameters and the step response of the final parameters;

FIG. 5 is a view showing a plot of the progress of updating of the control parameters $k_p$ and $n_p$;

FIG. 6 is a view showing a plot of the progress of updating of the control parameters $k_p$ and $n_p$ when a constraint condition is applied.

DESCRIPTION OF THE PREFERRED EMBODIMENTS

Figure 7:
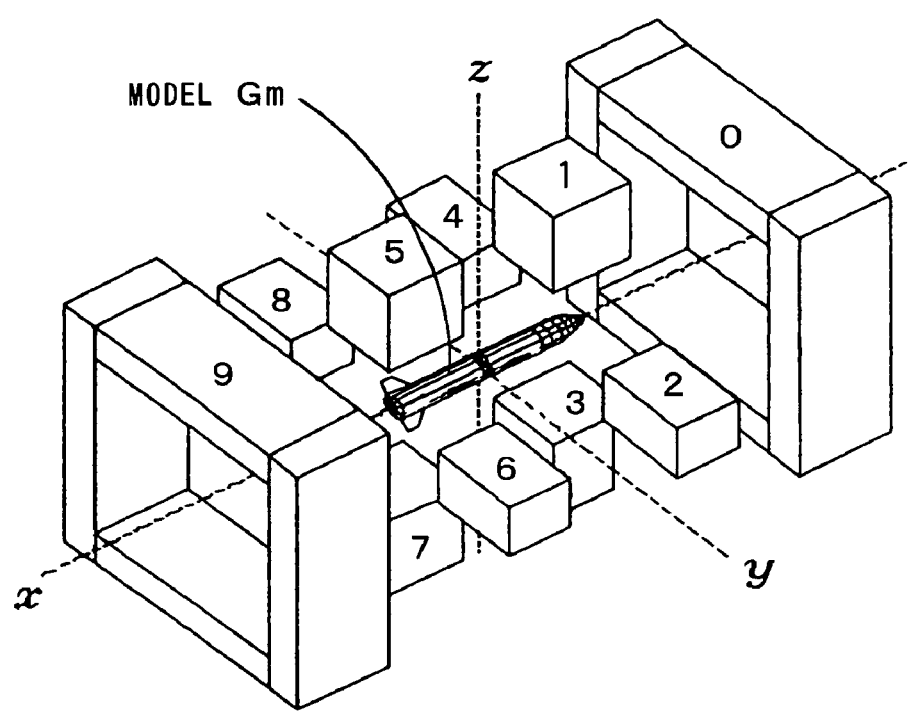
FIG. 7 is a view showing the basic construction of a magnetic suspension and balance system for a high subsonic wind tunnel at the Institute of Space Technology and Aeronautics.

Before describing the present invention, first of all, the magnetic suspension and balance system that is employed in the present invention, and the control system thereof will be described. The magnetic suspension and balance system for a high subsonic wind tunnel at the Institute of Space Technology and Aeronautics (JAXA) has the construction shown in FIG. 7. Two air-core coils 0, 9 and eight electromagnets 1 to 8 are arranged outside a wind tunnel test section of 10 cm×10 cm cross-sectional size. An Alnico magnet of ordinary cylindrical shape is employed as the wind tunnel model Gm. As shown in FIG. 7, the x, y, and z coordinate axes are as follows: x is the wind tunnel axial direction, y is the horizontal direction and z is the vertical direction; rotation about these respective axes is designated as rolling (φ), pitching (θ) and yawing (ψ). Coils are then assembled in combinations as shown in Table 1 in this magnetic suspension and balance system (hereinbelow abbreviated as 10 cm MSBS) in order to apply magnetic forces/moments in these axial directions. The coil numbers in Table 1 correspond to the coil numbers in FIG. 7.

TABLE 1

JAXA MSBS Coil Combinations

| Acting force | Coil combination |
| --- | --- |
| Drag ($F_x$) | 0 + 9 |
| Transverse force ($F_y$) | (2 + 4) + (6 + 8) |
| Weight, lift force ($F_z$) | (1 + 3) + (5 + 7) |
| Pitching moment ($N_y$) | (1 + 3) − (5 + 7) |
| Yawing moment ($N_z$) | (2 + 4) − (6 + 8) |

If the magnetic moment vector that supports the model Gm is designated as M and the magnetic field intensity vector around the model is designated as H, the magnetic force F and the moment N acting on the model may be expressed as follows:

$$F = (M \cdot \nabla)H \quad (1)$$

$$N = M \times H \quad (2)$$

In designing the 10 cm MSBS control system, the following assumptions may be made. Assumption 1: motion in the direction of the rolling axis ($\phi$) is not considered. Assumption 2: the pitch angle ($\theta$) and the yaw angle ($\psi$) are sufficiently small. Based on the above two assumptions, equations (1) and (2) are linearized for the current in each axial direction and the transfer function GM of the model position/attitude angle output with respect to the current input may be found as follows.

$$Gm(s) = bc/s^2, \quad b = M_x h/m, \quad c = 10^3 \text{ or } 180/\pi \quad (3)$$

where $M_x$ is the magnetic moment in the x-axis direction of the magnet, and m is the mass or inertial moment of the entire model, and h is the magnetic field gradient per unit current.

Also, the dynamics of the coil are approximated by a first order delay:

$$G_c(s) = 1/(\tau s + 1) \quad (4)$$

Control of the model in the 10 cm MSBS is performed as shown in FIG. 1. The position of the model Gm and its attitude angle y are detected by the model position sensor Hs. A noise cut-off filter Hn is employed in order to remove noise v from the output of this sensor. The position and attitude angle of the wind tunnel model Gm are detected by means of an optical sensor of sampling frequency $T_s$=478.3 Hz and are applied to a Butterworth noise cut-off filter of cut-off frequency 60 Hz. However, the sensor has a dead time of about 3 msec. Also the noise filter has a phase lag, so the detected position and attitude angle lag the actual phase and attitude angle. The phase is therefore advanced using a double phase advancer Hp.

$$H_p(q) = n_p^2 \cdot \{(p_b - q^{-1})/(p_a - q^{-1})\}^2 \quad (5)$$

$$P_b = (n_p T_p + T_s)/n_p T_p, \quad p_a = (T_p + T_s)/T_p \quad (6)$$

where q is the shift operator and the time constant ratio ($n_p$) of the numerator and denominator of the phase advancer, and the time constant ($T_p$) are given in the actual control program. Control is performed in accordance with $$K(q) = k_p \{1 + T_s/T_i(1 - q^{-1})\} \quad (7)$$

by taking the difference between this phase-advanced position and attitude angle information and the target set position and inputting to the PI controller K. The control current value u is then applied to the coil system Gc (electromagnet/coil). A magnetic field is thus formed whose magnetic force acts on the model magnet.

It is known that, in the JAXA 10 cm MSBS, there is coupling motion of the model between the x axis and θ axis. Accordingly, in the present study, a decoupling control system is introduced in order to eliminate this coupling motion and θ and x can thereby be viewed as a single input/single output (SISO) system.

In a flow test, aerodynamic force acts as an external force d on the model. Also $u_r$ is an arbitrary applied oscillation current that is provided separately from the control current. For simplicity, the control subject including the model and coil system are given the overall designation P (portion indicated by the broken line in the Figure) and the noise filter and double phase advance factor in the feedback path are given the overall designation H (portion indicated by the broken line in the Figure).

The model that is to be controlled has six degrees of freedom but if control of the rolling axis is not performed, there are five degrees of freedom; control of the model is independently performed in respect of five axes to six axes. The control parameters for a single axis are the double phase advance $n_p$, $T_p$ and the PI controller proportional gain ($k_p$) and the PI controller integration time ($T_i$). Of these, it is sufficient if, for $T_p$ a value close to the control frequency is selected, and for $T_i$ a value is selected of a magnitude such that the steady deviation of the model position/attitude angle disappears; the change of model response produced by changes of these is extremely small. The control parameters that need to be adjusted can therefore be restricted to $n_p$ and $k_p$. Hereinbelow, the control parameters that need to be adjusted for a single axis are referred to together by the designation:

$$\rho = [k_p n_p]^T \quad (8)$$

where T indicates the transpose of the vector.

From FIG. 1, the open loop transfer functions of the position y and control input u can be expressed as:

$$y(\rho) = Pu(\rho) \quad (9)$$

$$u(\rho) = u_r + K(\rho)\{r - H(\rho)y(\rho)\} \quad (10)$$

The open loop transfer functions of the position y and control input u are therefore:

$$y(\rho) = PK(\rho)r/(1 + L(\rho)) + P \cdot u_r/(1 + L(\rho)) \quad (11)$$

$$u(\rho) = K(\rho)r/(1 + L(\rho)) - u_r/(1 + L(\rho)) \quad (12)$$

where $L(\rho) = PH(\rho)K(\rho)$.

If the sampling data $y_t$(t=1, 2, ..., N) of the model position (or attitude angle) with respect to time sequence data $r_t$(t=1, 2, ..., N) of a given target set position (or attitude angle), and sampling data $u_t$(t=1, 2, ..., N) of the control current that is then applied are obtained, the performance index used to evaluate the goodness of tracking of the target set position (or attitude angle) may be set as:

$$J(\rho) = \frac{1}{2N} \sum_{t=1}^{N} \{(T_d r_t - y_t)^2 + \lambda(\Delta u_t)^2\} \quad (13)$$

and the control parameter ρ that optimizes this performance index found by the Gauss-Newton method, where λ>0 is a weighting coefficient, $\Delta = 1 - q^{-1}$ is a difference operator ($\Delta u_t = u_t - u_{t-1}$), and Td is a filter for generating the desired response waveform. For example, if $T_d$ is set as a filter representing a second order system having a given characteristic frequency and damping factor, the performance index becomes a minimum when the response of the model approaches the response waveform of this characteristic frequency and damping factor. For simplicity the subscript t is omitted hereinbelow.

If the control parameter on the k-th test run is $\rho^k$, the performance index J must be reduced from the magnitude of the performance index on the k-th test run in accordance with the control parameter $\rho^{k+1}$ on the next i.e. (k+1)-th test run. The following procedure is adopted in order to obtain this $\rho^{k+1}$.

[Test run 1] Taking $r=r_1$, $u_r=0$, the model position/attitude angle $y^1$ and control current $u^1$ are acquired. Hereinbelow, the superscripts 1 and 2 indicate data obtained in the first test run and second test run respectively.

[Calculation] The applied oscillation current $u_r$ is calculated as:

$$u_r(\rho) = K_i' r^1 - (KH)_i' y^1 \qquad (14)$$

where $(\ )_i'$ indicates differentiation of the control parameter $\rho_i$ (i=1, 2). That is, two applied oscillation currents $u_r$ are obtained, namely, that relating to $\rho_1$ and that relating to $\rho_2$.

[Test run 2] Taking $r=0$, $u_r=u_i$ (i=1, 2), the model position/attitude angle $y_i^2$ and control current $u_i^2$ are acquired.

The update quantities of the control parameters are obtained from the $y^1$, $u^1$ and $y_i^2$, $u_i^2$ that were obtained by the above test runs.

$$J'(\rho) = [J_1'(\rho) \quad J_2'(\rho)]^T, \qquad (15)$$

$$J_i'(\rho) = \frac{1}{N} \sum_{t=1}^{N} \{-y_i^2(T_d r^1 - y^1) + \lambda(\Delta u_i^2)(\Delta u^1)\}$$

$$R(\rho) = \begin{bmatrix} R_{11}(\rho) & R_{12}(\rho) \\ R_{21}(\rho) & R_{22}(\rho) \end{bmatrix}, \qquad (16)$$

$$R_{ij}(\rho) = \frac{1}{N} \sum_{t=1}^{N} \{y_i^2 y_j^2 + \lambda(\Delta u_i^2)(\Delta u_j^2)\}$$

$$\rho^{k+1} = \rho^k + \gamma^k d^k, \quad d^k = -R^{-1}(\rho)J'(\rho) \qquad (17)$$

where $\gamma$ is a value for adjusting the step width of updating of the control parameters but can in many cases be set as 1. Control parameters for which the performance index is a minimum are obtained by repeating the updating of the control parameters in this way several times.

However, in some cases, with a magnetic suspension and balance system, control of the model becomes unstable, depending on the way in which the control parameters are applied. Accordingly, a function to prevent control of the model becoming unstable is required but, on the other hand, the feedback amounts must be made as small as possible since feedback control is performed in real time. Constraint conditions are therefore applied to the control parameters in order to guarantee stability. Since the control parameters $k_p$ and $n_p$ to be adjusted are both control parameters related to the gain, a total of five constraint conditions may be considered, on their respective upper and lower limits and on the upper limit of the product of these two control parameters. These constraint conditions may be expressed as:

$$\begin{cases} g_1 = p_1 - k_p \leq 0 \\ g_2 = k_p - p_2 \leq 0 \\ g_3 = p_3 - n_p \leq 0 \\ g_4 = n_p - p_4 \leq 0 \\ g_5 = n_p - p_5 k_p - p_6 \leq 0 \end{cases} \qquad (18)$$

If the control parameters $k_p^{k+1}$ and $n_p^{k+1}$ that are updated on the (k+1)-th run do not satisfy at least one of the constraint conditions of expression (18), the control quantity $d^k$ must be altered in order to satisfy these constraint conditions. If this newly updated quantity is represented as $\delta^k$, when the constraint condition $g_1$ is applied, $$\delta^k = d^k - \frac{1}{\gamma^k} \begin{bmatrix} k_p^{k+1} - p_1 \\ 0 \end{bmatrix} \qquad (19)$$

When the constraint condition $q_2$ is applied, $$\delta^k = d^k - \frac{1}{\gamma^k} \begin{bmatrix} k_p^{k+1} - p_2 \\ 0 \end{bmatrix} \qquad (20)$$

When the constraint condition $q_3$ is applied, $$\delta^k = d^k - \frac{1}{\gamma^k} \begin{bmatrix} 0 \\ n_p^{k+1} - p_3 \end{bmatrix} \qquad (21)$$

When the constraint condition $q_4$ is applied, $$\delta^k = d^k - \frac{1}{\gamma^k} \begin{bmatrix} 0 \\ n_p^{k+1} - p_4 \end{bmatrix} \qquad (22)$$

When the constraint condition $q_5$ is applied, $$\delta^k = d^k - \frac{1}{\gamma^k(p_5^2 + 1)} \begin{bmatrix} -p_5 \\ 1 \end{bmatrix} (n_p^{k+1} - p_5 k_p^{k+1} - p_6) \qquad (23)$$

By applying this technique, stability of control of the model can be guaranteed even though the amount of calculation is suppressed.

In the JAXA 10 cm MSBS shown in FIG. 7, a cylindrical model of diameter 8 mm, length 100 mm was arranged in the direction of the x axis, and the control parameter automatic adjustment method according to the present invention was verified using numerical simulation. As the $T_i$ and $T_p$ for which automatic adjustment was performed, the conventionally employed values $T_i=2.0$ and $T_p=2.0\times10^{-3}$ were employed. As the ideal response, a second order vibration system step response of characteristic vibration frequency 5.0 Hz, attenuation factor 0.8, with a weighting coefficient $\lambda=0.01$ and step width of $\gamma=1.0$ was selected.

First of all, the case was studied in which no constraint conditions were applied. FIG. 2 is a view showing a comparison of the ideal response (broken lines), the response (fine lines) produced by the control parameters applied as initial values and the response produced after optimization (thick lines), in respect of model position and control current. The number of iterations was five. Although fixed values were chosen for $T_i$ and $T_p$, the same response as with a second order vibration system could be satisfactorily obtained simply by varying $k_p$ and $n_p$, so it can be seen that it is effective in terms of reducing the amount of calculation to restrict the control parameters to be adjusted to $k_p$ and $n_p$. FIG. 2 shows the history of the control parameters and evaluation function during these iterations.

TABLE 2

Control parameters and performance index

| iteration | $k_p$ | $n_p$ | J |
|---|---|---|---|
| 1 | 4.00 | 10.00 | $3.514 \times 10^{-4}$ |
| 2 | 4.08 | 12.92 | $5.365 \times 10^{-5}$ |
| 3 | 4.39 | 14.82 | $1.089 \times 10^{-5}$ |
| 4 | 4.31 | 15.10 | $1.026 \times 10^{-5}$ |
| 5 | 4.31 | 15.12 | $1.026 \times 10^{-5}$ |

It can be seen that the performance index decreases abruptly up to the third iteration and then rapidly decreases to a minimum value. It should be noted that it was confirmed that, even if the control parameters started from different initial values, they converged to practically the same values.

Next, in order to verify the effectiveness of the updating rule when constraint conditions were reached, setting was effected such that the constraint conditions were reached before the minimum value was reached and a numerical simulation was conducted. As an example, the case where only the following constraint condition was applied is considered.

$$g_5 = n_p + 2.5 k_p - 24.5 \leq 0 \qquad (18)$$

FIG. 3 shows the contours of magnitude of the performance index and how the control parameters are updated. The broken lines in the Figure indicate the boundary lines of the constraint conditions. It can be seen that, although the initial values start from different points, when the control parameters reach the constraint conditions, they move towards a minimum value in the range in which the constraint conditions are satisfied. Thus, starting from a point at which $k_p=3.0$ and $n_p=12.0$, after five iterations, $k_p=3.82$ and $n_p=14.96$ is reached; starting from a point at which $k_p=4.0$ and $n_p=10.0$, the point $k_p=3.82$ and $n_p=14.95$ is reached i.e. practically the same point is reached. This shows the validity of the updating rule when the constraint condition is reached. Although, in this case, a condition was set in which the constraint condition was forcibly reached, in fact, it is desirable to effect setting such that the constraint conditions enclose the minimum value. If this is done, even if the control parameter reaches the constraint condition on a given iteration, it will immediately return to the constraint condition and the minimum value will again be sought on the next iteration. The stability of MSBS may therefore be said to be guaranteed by this technique.

PRACTICAL EXAMPLE

FIG. 4 to FIG. 6 show the results of conducting a test with the model actually set up. For the test, the JAXA 10 cm MSBS shown in FIG. 7 was employed. The model used was an Alnico magnet of diameter 8 mm, length 100 mm, fitted with a cone made of steel of diameter 8 mm, length 20 mm at its tip. Automatic adjustment of the control parameters was conducted in respect of the z-axis in the vertical direction.

FIG. 4 is a view showing how the response of the model approaches the designated response. A second order system of characteristic frequency 5 Hz, damping factor 0.8 was selected as the ideal response. The Figure shows a comparison with the response obtained after the fourth test run when control parameters $k_p=1.2$ and $n_p=8.0$ were selected as the initial condition, and automatic adjustment of control parameters was conducted in accordance with the technique of the present invention. Also, $\lambda=0.01$ and $\gamma=1.0$ were chosen as parameters of the automatic adjustment. $\lambda$ is a weighting coefficient and $\gamma$ is a value used to adjust the step width of control parameter updating. Although in principle there would be four control parameters, fully satisfactory adjustment results are obtained if the number of control parameters is restricted to two.

FIG. 5 is a view showing how convergence to the same control parameters takes place even when different values of the control parameters are given as initial values. Convergence to values of $k_p=1.02$ and $n_p=40.3$ after four or five test runs takes place whether the initial values are set to $k_p=1.2$ and $n_p=8.0$, as indicated by the broken line with the $\Delta$ symbols or whether the initial values are set to $k_p=1.5$, $n_p=10.0$, as indicated by the continuous line, with the circular symbols.

FIG. 6 is a view showing the way in which the control parameters change when boundary conditions are applied. Although the constraint conditions should, properly speaking, be set so as to enclose the optimum control parameters so that the stable range of model control is as wide as possible, in this case, in order to verify the effectiveness of automatic adjustment when constraint conditions were applied, constraint conditions were forcibly applied as indicated by the fine broken lines in FIG. 6. This shows that when constraint conditions are applied the control parameters change following the boundary lines of the constraint conditions.

What is claimed is:

1. A method of automatic adjustment of control parameters comprising the steps of:
    applying an iterative feedback tuning method to a feedback control system for a magnetic suspension system;
    determining those control parameters that have less of an effect on the control performance of the system relative to the other control parameters;
    selectively discarding those control parameters; and
    allowing the other control parameters to be guided to optimum values to obtain a response waveform desired by a designer directly from sets of input and output data of a controlled subject,
    wherein a proportional gain ($k_p$) of proportional integral control and the time constant ratio ($n_p$) of the numerator and denominator of a double phase advancer are adopted as control parameters that have more of an effect on the control performance of the system, relative to other control parameters on control performance of the system, for a feedback control system in which proportional integral control and double phase advancer are jointly employed in a magnetic suspension and balance system.

2. The method of automatic adjustment of control parameters according to claim 1 wherein constraint conditions are placed on the control parameters for guaranteeing stability of control of the system, these constraint conditions comprise upper and lower limits on the proportional gain ($k_p$) of proportional integral control and the gain ($n_p$) of a phase lead and an inequality constraint condition on the upper limit of the product of ($k_p$) and ($n_p$) is set.

3. The method of automatic adjustment of control parameters according to claim 2 wherein, when obtaining sampling data $y_t(t=1, 2, \ldots, N)$ of position of a model with respect to time sequence data $r_t(t=1, 2, \ldots, N)$ of a given target set position and sampling data $u_t(t=1, 2, \ldots, N)$ of control currents that are then applied, a performance index for evaluating the quality of tracking of the target set position is set up by the following equation and a control parameter $\rho$ is found:

$$J(\rho) = \frac{1}{2N} \sum_{t=1}^{N} \{(T_d r_t - y_t)^2 + \lambda(\Delta u_t)^2\}$$

where $\lambda > 0$ is a weighting coefficient, $\Delta = 1 - q^{-1}$ is a difference operator ($\Delta u_t = u_{t-1}$), where q is the shift operator, and $T_d$ is a filter for generating the desired response waveform.

4. A method of automatic adjustment of control parameters comprising the steps of:
applying an iterative feedback tuning method to a feedback control system for a magnetic suspension system;
determining those control parameters that have less of an effect on the control performance of the system relative to the other control parameters;
selectively discarding those control parameters; and
allowing the other control parameters to be guided to optimum values to obtain a response waveform desired by a designer directly from sets of input and output data of a controlled subject;
wherein a constraint condition is added to the control parameters in respect of the feedback control system of a magnetic suspension system in order to make it possible to control the system in a stable fashion;
wherein the proportional gain ($k_p$) of proportional integral control and the gain ($n_p$) of the phase lead are adopted as control parameters that have more of an effect on the control performance of the system, relative to other control parameters on control performance of a magnetic suspension and balance system, in respect of a feedback control system in which proportional integral control and double phase advancer are jointly employed in the magnetic suspension and balance system.

5. The method of automatic adjustment of control parameters according to claim 4 wherein, when obtaining sampling data $y_t(t=1, 2, \ldots, N)$ of position of the model with respect to time sequence data $r_t(t=1, 2, \ldots, N)$ of a given target set position and sampling data $u_t(t=1, 2, \ldots, N)$ of the control currents that are then applied, a performance index for evaluating the quality of tracking of the target set position is set up by the following equation and a control parameter $\rho$ is found:

$$J(\rho) = \frac{1}{2N} \sum_{t=1}^{N} \{(T_d r_t - y_t)^2 + \lambda(\Delta u_t)^2\}$$

where $\lambda > 0$ is a weighting coefficient, $\Delta = 1 - q^{-1}$ is a difference operator ($\Delta u_t = u_{t-1}$), where q is the shift operator, and $T_d$ is a filter for generating the desired response waveform.

6. The method of automatic adjustment of control parameters according to claim 4 wherein, as constraint conditions on the control parameters for guaranteeing stability of control of the system, upper and lower limits on the proportional gain ($k_p$) of proportional integral control and the gain ($n_p$) of the phase lead and an inequality constraint condition on the upper limit of the product of ($k_p$) and ($n_p$) is set.

* * * * *